Patented Dec. 30, 1952

2,623,884

UNITED STATES PATENT OFFICE 2,623,884

CONDENSATION PRODUCTS OF ALKENYL DIACYL HALIDES AND AMINOARYL-AMINO AMINOANTHRAQUINONES

Albin Peter and Wolfgang Frey, Basel, Switzerland, assignors to Sandoz A. G., Basel, Switzerland, a Swiss firm No Drawing. Application December 22, 1950, Serial No. 202,418. In Switzerland January 3, 1950

12 Claims. (Cl. 260—368)

1

The present invention relates to new green substantive dyestuffs of the anthraquinone series.

Commercial azo dyestuffs which dye cotton and other cellulosic materials in shades of green leave much to be desired from the standpoint of fastness properties. A primary object of the present invention is to provide green dyestuffs which are free of the indicated deficiencies of the said known dyestuffs.

This object is realized according to the present invention by means of new dyestuffs of the anthraquinone series wherein, briefly stated, two anthraquinone nuclei are interconnected by a fumaric acid bridge. Dyestuffs wherein anthraquinone nuclei are interconnected by a bridge, as for example a urea bridge, are known; however, these yield blue dyeings. It was therefore wholly unexpected and unforeseeable that the new dyestuffs of the invention would yield green dyeings with fastness properties which are significantly superior not only to those of the aforesaid commercial dyes but also to those of the known blue-dyeing anthraquinones.

It was also unexpected and unforeseeable that it would be possible to obtain unsymmetrical dyestuffs by the new method of interconnecting two different anthraquinone nuclei by a fumaric acid bridge. The known blue products mentioned above wherein anthraquinone nuclei are interconnected by as for example a urea bridge, are all symmetrical ones; it could not be foreseen that an acid dihalide being so easily saponifiable such as a fumaric or a maleic acid dihalide would be able to be condensed with different anthraquinone nuclei.

The new dyestuffs of the present invention are obtained by condensing 1 mol of a 1-aminoanthraquinone - 2 - sulfonic acid which corresponds to the type formula (i)

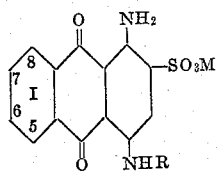

wherein R stands for a phenyl or diphenyl radical which contains a free amino group and which may be substituted by lower alkyl such as methyl, ethyl and the like, by lower alkoxy such as methoxy, ethoxy and the like, or by SO₃H, and M stands for H, Li, Na or K, and nucleus I may carry in the positions 5, 6, 7 or 8 a sulfonic acid group or in the positions 6 or 7 a halogen atom, e. g. chlorine or bromine, or in the positions 6 and 7 two chlorine atoms, with a second mol of the same or a different 1-amino-anthraquinone-

2

2-sulfonic acid of formula (i), by the action of 1 mol of a dihalide which corresponds to the type formula

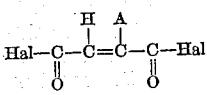

wherein Hal stands for chlorine or bromine, and A stands for chlorine, bromine or methyl.

The starting compounds of formula (i) are obtained by the condensation of a 1-amino-4-halogenanthraquinone-2-sulfonic acid which corresponds to the type formula

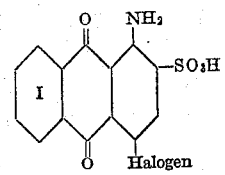

wherein nucleus I may be substituted as hereinbefore set forth, with p-phenylenediamine or benzidine, or with a p-phenylenediamine or a benzidine, wherein the phenyl nuclei are substituted by lower alkyl, lower alkoxy or SO₃H, as previously indicated in connection with the definition of R. Starting compounds of formula (i) thus comprise, for example, the condensation products of 1-amino-4-bromo-anthraquinone-2-sulfonic acid with 1,4-diamino-benzene, 1,4-diamino - 2 - methylbenzene, 1,4-diamino-2-methoxybenzene, 1,4-diaminobenzene-2-sulfonic acid and 4,4'-diaminodiphenyl-3-sulfonic acid; the condensation products of 1-amino-4-bromoanthraquinone-2,5-, -2,6-, -2,7- and -2,8-disulfonic acid as well as mixtures of these sulfonic acids with p-phenylenediamine, benzidine, 4,4'-diaminodiphenyl-3-sulfonic acid, 4,4'-diamino-3,3'-dimethyldiphenyl and 4,4'-diamino-3,3'-dimethoxy-diphenyl; the condensation products of 1-amino-4-bromo-6- and -7-chloro-anthraquinone-2-sulfonic acid with 4,4'-diaminodiphenyl-3-sulfonic acid; the condensation product of 1-amino-4-bromo-6,7-dichloro-anthraquinone-2-sulfonic acid with 4,4'-diaminodiphenyl-3-sulfonic acid; etc.

The dihalides used for forming the bridge between the anthraquinone moieties, are the dichlorides and dibromides of fumaric acid, maleic acid, chlorofumaric acid, bromofumaric acid and mesaconic acid. The stereo form in which the acid radicals are present in the dyestuffs is not of importance in so far as the dyeing properties are concerned since, for example, the chlorides of fumaric and maleic acid yield the same dyestuffs.

In carrying out the condensation, the starting compounds (i), in the form of their lithium, sodium or potassium salts, individually or in admixture with each other in substantially equimolal proportions, are dissolved in water and are treated with the dihalide at a low temperature (−10° C. to about +30° C.). In order to suppress hydrolysis of the dihalide as far as possible, it is advantageous to work in a solvent, which is inert to the dihalide, such as carbon tetrachloride, chloroform, benzene, chlorobenzene or acetone. The acid liberated during the reaction is neutralized with an alkali, which may be added at the beginning or during the reaction proportionately as hydrogen halide is split off. According to a preferred mode of procedure, the alkali is allowed to run into the solution of the starting compound (i) simultaneously with the dihalide, so that the reaction of the liquid is neutral at all times. Alkalies which may be employed in this connection comprise for example the oxides, hydroxides and carbonates of lithium, sodium, potassium, calcium and magnesium. The choice of acid-binding agent is generally without influence on the course of the reaction; it is generally made on the basis of the solubility characteristics of the starting and final products.

The initially mentioned proportion of one mol of dihalide per two mols of starting compound (i) is based on stoichiometric considerations. In practice, it is preferred to increase the quantity of dihalide somewhat, in order to take care of losses due to hydrolysis. Decisive in this regard is the disappearance of the starting material, which can be readily ascertained by a spot test on filter paper and washing out the spot with 1% sodium carbonate solution or with alcohol.

The structure of the new dyestuffs, in the free form, according to this invention may be represented by the formula

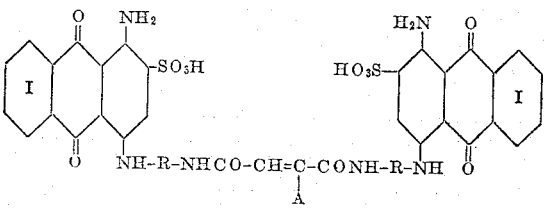

wherein R stands for a phenyl or diphenyl radical which may be substituted by lower alkyl such as as methyl, ethyl and the like, by lower alkoxy such as methoxy, ethoxy and the like, or by $SO_3H$, wherein A has the previously-indicated significance, and wherein nucleus I may carry the substituents hereinbefore enumerated.

The dyestuffs are obtained in the form of their alkali metal salts by evaporation of the solvent or by salting out and filtering. They may also be precipitated, filtered and made neutral by trituration with lithium carbonate, sodium carbonate or potassium carbonate. Amine salts may be obtained from the free dyestuff acids by neutralization with ammonia or with an organic amine, such as methylamine, ethanolamine or triethanolamine.

The new dyestuffs dissolve in water with a green coloration and draw from these solutions with a blue-green, green to yellowish green color onto cotton and regenerated cellulose, as well as onto paper and straw. The dyeings are characterized by outstanding fastness to light, and also by generally good wet fastness properties.

The illustrative examples which follow exemplify presently preferred typical embodiments of the invention. Parts and percentages are by weight, unless otherwise indicated. Parts by weight bear the same relation to parts by volume, in these examples, as do grams to cubic centimeters. The Roman numerals in the examples refer to the corresponding intermediates of the following table. Where nucleus I is unsubstituted, i. e. where X is hydrogen, this is indicated by dash (—) marks in the table:

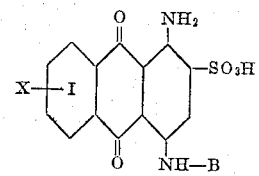

| No. | B | X | Position of X |
|---|---|---|---|
| I | –⬡–⬡–$NH_2$ | $-SO_3H$ | 6. |
| II | –⬡–⬡–$NH_2$ | $-SO_3H$ | 7. |
| III | –⬡–$NH_2$ | --- | --- |
| IV | –⬡–⬡–$NH_2$ (with $SO_3H$) | --- | --- |
| V | –⬡–$NH_2$ (with $OCH_3$) | --- | --- |
| VI | –⬡–$NH_2$ (with $CH_3$) | --- | --- |
| VII | –⬡–$NH_2$ | $-SO_3H$ | 7. |
| VIII | –⬡–$NH_2$ (with $OCH_3$) | $-SO_3H$ | 7. |
| IX | –⬡–⬡–$NH_2$ (with $CH_3$, $CH_3$) | $-SO_3H$ | 7. |
| X | –⬡–⬡–$NH_2$ | One $-SO_3H$ | 5 and 8 mixture. |
| XI | –⬡–⬡–$NH_2$ | --- | --- |
| XII | –⬡–⬡–$NH_2$ (with $CH_3$, $CH_3$) | $-SO_3H$ | 6. |
| XIII | –⬡–$NH_2$ | $-SO_3H$ | 6. |
| XIV | –⬡–⬡–$NH_2$ (with $CH_3O$, $OCH_3$) | $-SO_3H$ | 7. |
| XV | –⬡–⬡–$NH_2$ (with $SO_3H$) | 2=Cl | 6 and 7. |
| XVI | –⬡–$NH_2$ (with $OCH_3$) | $-SO_3H$ | 6. |

Example 1

8.6 parts of the sodium salt of compound III are dissolved in 800 parts of water, the solution cooled to 0° C., and 2 parts of fumaryl chloride (ClCOCH=CHCOCl) added dropwise in the course of 3 hours. The reaction is maintained neutral by the simultaneous addition of an aqueous solution of 2.4 parts of sodium hydroxide. The reaction mixture is stirred for 3 more hours, then heated up to 70° C., and 16 parts of common salt (sodium chloride) are added. The precipitated dyestuff is separated by suction filtration and is dried. It dissolves in water with a green coloration and dyes cotton and regenerated cellulose in clear green shades of good fastness to washing and outstanding fastness to light. The free dyestuff corresponds to the formula

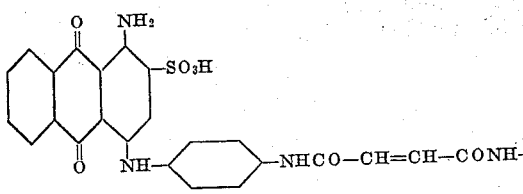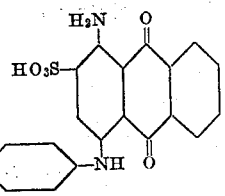

Example 2

8.2 parts of compound III, 2.7 parts of an aqueous sodium hydroxide solution of 30% strength and 800 parts of water are stirred until solution is achieved. After the addition of 5 parts of sodium bicarbonate, the solution is cooled to 0° C. and, at this temperature, a solution of 2 parts of fumaryl chloride in 20 parts of carbon tetrachloride is added dropwise. After continued stirring for a short time, the dyestuff is worked up as described in Example 1. It is identical with the product of Example 1.

Example 3

8.2 parts of compound III and 1.5 parts of potassium carbonate are dissolved in 600 parts of water at a temperature of 0° C., a solution of 3.2 parts of fumaryl bromide (BrCOCH=CHCOBr)

in 20 parts of toluene is added dropwise within the course of 3 hours, and the reaction maintained neutral by sprinkling in about 3 parts of calcium carbonate. At the end of 2 additional hours, the reaction mixture is heated to 70° C. and the formed dyestuff is precipitated by acidification with 15 parts of concentrated hydrochloric acid. The precipitated dyestuff is separated by suction filtration, and the product is triturated with lithium carbonate or sodium carbonate until a neutral reaction is obtained, whereupon the product is dried. The resultant dyestuff has the same properties as those of the dyestuff obtained according to Example 1.

Example 4

9 parts of potassium salt of the compound III are dissolved in 500 parts of water and 320 parts of acetone. After cooling to −10° C., 2 parts of fumaryl chloride are added in the course of 2 hours, and the hydrogen ion concentration of the reaction mixture is maintained at a pH of 7 to 7.5 by the addition of potassium carbonate. After stirring for several hours, the product is suction filtered and the separated product is stirred with 300 parts of a 2% aqueous potassium chloride solution, again filtered and then dried. The formed dyestuff, having the properties described in Example 1, is obtained in the form of potassium salt.

Example 5

8.6 parts of the sodium salt of compound III are stirred into 170 parts of water. A solution of 20 parts of chloroform and 2 parts of the acid chloride obtainable from maleic anhydride and phosphorus pentachloride is then added in the course of 3 hours at a temperature of 0° C., the reaction being meanwhile constantly maintained very weakly alkaline by the addition of an aqueous solution of 2.4 parts of sodium carbonate. After the lapse of 3 more hours, the reaction mixture is poured into 500 parts of a 2% aqueous solution of common salt, and the dyestuff separated by filtration and dried. The dyestuff draws onto cotton with a green color and yields dyeings having properties similar to those described in Example 1.

Example 6

8.2 parts of compound III are stirred with 0.5 part of magnesium oxide in 500 parts of water. 1.7 parts of fumaryl chloride, dissolved in 20 parts of carbon tetrachloride, are added at 15° C., and the hydrochloric acid liberated in the reaction is neutralized by the continuous addition of magnesium carbonate. After stirring for some time, the reaction mixture is heated to 70° C., acidified with 20 parts of concentrated hydrochloric acid and filtered. The filter cake is triturated to neutrality with sodium carbonate and is then dried. The obtained dyestuff has the same properties as that described in Example 1.

Example 7

12.2 parts of the sodium salt of compound I are dissolved in 500 parts of water. At 0–5° C. and in the course of 1½ hours, 1.7 parts of fumaryl chloride, dissolved in 20 parts of carbon tetrachloride, are added dropwise, and the reaction maintained neutral by the sprinkling of about 1.1 parts of sodium carbonate. After the lapse of 5 more hours the reaction mixture is heated to 80° C. and a 3% aqueous potassium chloride solution added. The precipitated dyestuff is separated by suction filtration at 60° C. and is washed and dried. It dissolves in water with a green coloration and dyes cotton and regenerated cellulose in a clear green shade with outstanding fastness to light and good fastness to washing. The new dyestuff corresponds in the free state, to the formula

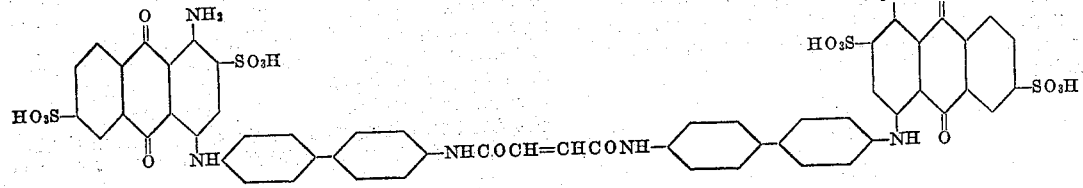

Example 8

4.3 parts of the sodium salt of compound III and 4.6 parts of the sodium salt of compound V are dissolved in 250 parts of water. A solution of 1.7 parts of fumaryl chloride in 20 parts of chloroform is added at about 0° C. in the course of 3 hours, and the liberated hydrochloric acid is neutralized by means of a solution of 2.4 parts of sodium bicarbonate in 30 parts of water. After the lapse of 5 more hours, the reaction mixture is heated to boiling, whereby the chloroform is removed with the formed steam. By the addition of a 1% common salt solution, the dyestuff is precipitated; it is separated by suction filtration at 60–70° C. and is then dried. It dyes cotton and regenerated cellulose from aqueous solution in a yellowish-green shade of good fastness properties. The new dyestuff corresponds in the free state, to the formula

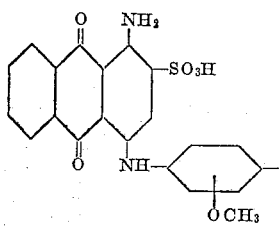 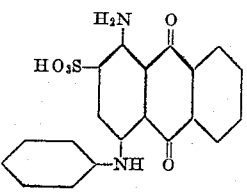

Example 9

4.3 parts of the sodium salt of compound III and 6.1 parts of the sodium salt of compound X are stirred into 270 parts of water. Then, at 0° C. and in the course of 3 hours, there is added a solution of 20 parts of trichlorethylene and 1.7 parts of maleic acid dichloride (ClCOCH=CHCOCl), the reaction being maintained very weakly alkaline by the sprinkling in of 2.4 parts of sodium bicarbonate. At the end of 3 additional hours, the reaction mixture is poured into 300 parts of a 2% aqueous common salt solution, and the precipitated dyestuff isolated by filtration and dried. The new dyestuff draws onto cotton and regenerated cellulose with a green color and with good fastness to washing and to light.

Example 10

11.3 parts of compound II and dissolved in 150 parts of water, with the addition of 4 parts by volume of a 29% aqueous caustic soda solution. At a temperature of 0° C., and within the course of 3 hours, a solution of 20 parts of acetone and 2 parts of chlorofumaryl dichloride

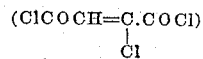

is added, the reaction being maintained very weakly alkaline throughout by the sprinkling in of 2.5 parts of sodium bicarbonate. At the end of 5 additional hours, 10.5 parts of common salt and 150 parts by volume of alcohol are added, the precipitated dyestuff is filtered at 60° C. and dried. It dyes cotton and regenerated cellulose from aqueous solution in bluish-green shade.

By replacing the chlorofumaryl dichloride with a corresponding quantity of bromofumaryl dichloride

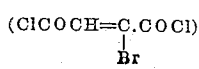

and otherwise proceeding as in the preceding paragraph, a similar dyestuff is obtained.

Example 11

6.35 parts of compound XV and 4.1 parts of compound III are dissolved in 500 parts by volume of water with the aid of 3.2 parts by volume of aqueous caustic soda solution of 29% strength. A solution of 1.7 parts of fumaryl chloride in 15 parts by volume of trichlorethylene is then added at 0° C. in the course of 3 hours, the reaction medium being maintained weakly alkaline by the sprinkling in of 4 parts of sodium bicarbonate. After 5 more hours, the formed green dyestuff is worked up as in the preceding examples. It dyes cotton and regenerated cellulose from aqueous solution in green shades which are fast to light and to washing.

Example 12

11.3 parts of compound I are dissolved in 750 parts of water with addition of 4 parts by volume of 29% aqueous caustic soda solution. At 0° C. and in the course of 1 hour, a solution of 1.9 parts of mesaconyl dichloride in 15 parts by volume of carbon tetrachloride is added dropwise, the reaction mixture being maintained very slightly alkaline by the sprinkling in of 4 parts of sodium bicarbonate. At the end of 5 additional hours, the reaction mixture is heated to boiling whereby the carbon tetrachloride is removed. After the addition of a 2% aqueous common salt solution, the dyestuff is removed by suction filtration at 50° C. and is then dried. It dyes cotton and regenerated cellulose from aqueous solution in green shades.

Example 13

12.2 parts of the sodium salt of compound I are dissolved in 750 parts by volume of water. At a temperature of 0° C. in the course of 2 hours and while stirring thoroughly, 2.1 parts of chlorofumaryl dichloride are added dropwise, the evolved acid being neutralized with 4 parts of sodium bicarbonate. Stirring is continued for an additional 3 hours, whereupon the dyestuff is precipitated by the addition of a 3% aqueous common salt solution at 60° C. The dyestuff is filtered off at 50° C. and dried. It dyes cotton and regenerated cellulose from aqueous solution in shades of bluish-green.

By proceeding as described in any of the foregoing examples, but replacing the starting compounds (I) used therein by a corresponding quantity of components I to XVI, as indicated in the following table—using a slight excess above the stoichiometric quantity of fumaryl chloride as the other condensant—additional dyestuffs are obtained which dye cotton in the specified shades and the dyeings of which on cotton and regenerated cellulose are of excellent fastness to light and of generally very good fastness to washing.

| Example | 1st component | 2nd component | Dyeings on cotton |
|---|---|---|---|
| 14 | V | V | Yellowish-green. |
| 15 | VI | VI | Bluish-green. |
| 16 | III | I | Green. |
| 17 | III | II | Do. |
| 18 | III | IX | Bluish-green. |
| 19 | III | XIV | Green. |
| 20 | VI | IX | Blue-green. |
| 21 | XI | VII | Green. |
| 22 | XI | I | Do. |
| 23 | XI | II | Do. |
| 24 | IV | VII | Do. |
| 25 | XIII | I | Do. |
| 26 | VII | I | Do. |
| 27 | VII | II | Do. |
| 28 | IV | I | Do. |
| 29 | IV | II | Do. |
| 30 | I | II | Do. |
| 31 | I | XIV | Yellowish-green. |
| 32 | I | X | Green. |
| 33 | XII | XII | Do. |
| 34 | XII | IX | Bluish-green. |
| 35 | II | II | Green. |
| 36 | II | XIV | Do. |
| 37 | IX | IX | Bluish-green. |
| 38 | IV | V | Green. |
| 39 | I | IX | Bluish-green. |
| 40 | XVI | I | Yellow-green. |

The dyestuffs of Examples 23, 24 and 28, for instance, correspond, in the free state, to the following formulae, respectively:

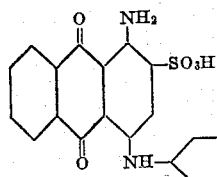
(Example 23)

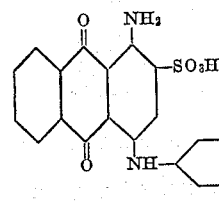
(Example 24)

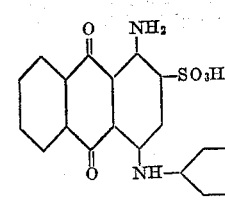
(Example 28)

Example 41

11.4 parts of the lithium salt of compound I are dissolved in 500 parts of water. At 0–5° C. and within the course of 1½ hours, 1.7 parts of fumaryl chloride, dissolved in 20 parts of carbon tetrachloride are added dropwise, the reaction being maintained neutral by the sprinkling in of 0.8 part of lithium carbonate. At the end of 5 more hours the reaction mixture is heated to 80° C., whereupon a 3% aqueous solution of sodium chloride is added. The precipitated dyestuff is separated by suction filtration at 60° C., and is washed and dried. It dissolves in water with green coloration and dyes cotton and regenerated cellulose a clear green of outstanding fastness to light and of good fastness to washing.

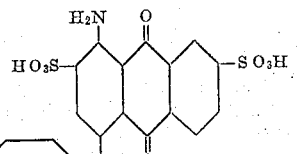

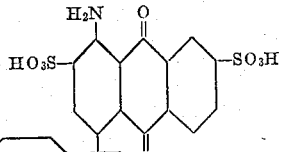

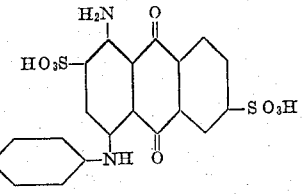

Example 42

4.15 parts of the lithium salt of compound III and 4.45 parts of the lithium salt of compound V are dissolved in 250 parts of water. At about 0° C. and in the course of 3 hours, a solution of 1.7 parts of fumaryl chloride in 20 parts of chloroform is added dropwise, and the liberated hydrochloric acid is neutralized with 2.4 parts of sodium bicarbonate, dissolved in 30 parts of water. Afer 5 hours have elapsed the reaction mixture is heated to boiling to remove the chloroform. The dyestuff is precipitated by the addition of a 1% aqueous common salt solution, and is then filtered off with suction at 60–70° C., and dried. It dyes cotton and regenerated cellulose from aqueous solution in yellowish-green shades of good fastness properties.

Example 43

5.1 parts of compound XI and 5.7 parts of compound II, both in the form of the free acids, are dissolved in 600 parts of water with the addition of 2.3 parts of lithium carbonate. A solution of 1.15 parts by volume of fumaryl chloride in 20 parts of trichlorethylene is then added dropwise at 0° C. in the course of 2 hours. The reaction mixture is kept very weakly alkaline by the sprinkling in of 0.8 part of lithium carbonate, stirring continued for an additional 4 hours, and the reaction mixture then heated to boiling whereby the trichlorethylene is removed. The dyestuff is precipitated by the addition of a 2% aqueous potassium chloride solution. The dyestuff is isolated by suction filtration at 50° C. and is then dried. From an aqueous solution, it dyes cotton, regenerated cellulose and straw in a green shade of very good fastness properties.

Example 44

5 parts of the lithium salt of compound VII and 5.8 parts of the lithium salt of compound IV are dissolved in 500 parts of water and to the resultant solution 1.15 parts by volume of fumaryl chloride are added dropwise within the course of 2 hours while stirring vigorously and at a temperature of 0° C. The reaction is maintained weakly alkaline throughout by the sprinkling in of 4 parts of sodium bicarbonate. At the end of 5 additional hours, the reaction mixture is heated to 80° C. and a 4% aqueous potassium chloride solution is then added. The precipitated dyestuff is filtered off at 50° C. and is then dried. It dyes cotton, regenerated cellulose and straw from aqueous solution in vivid shades of green which are fast to washing and to light.

*Example 45*

5.65 parts of compound I and 5.65 parts of compound IV are dissolved in 500 parts of water with addition of 1.5 parts of lithium carbonate. A solution of 1.7 parts of fumaryl chloride in 20 parts of carbon tetrachloride is then added dropwise at 0° C. within a period of 2 hours, the resultant hydrochloric acid being neutralized by the sprinkling in of 0.8 part of lithium carbonate. Thereupon stirring is continued for 3 more hours, following which the reaction mixture is heated to 60° C. A 3% aqueous solution of common salt is added and the precipitated dyestuff is filtered off and dried. The dyestuff dyes cotton and regenerated cellulose from aqueous solution in vivid green shades. The dyeings possess good fastness to washing and to light.

*Example 46*

5.8 parts of the lithium salt of compound IV and 4.45 parts of the lithium salt of compound V are dissolved in 600 parts of water. To the resultant solution, cooled to 0° C., there is added dropwise within the course of 2 hours, a solution of 1.7% of fumaryl chloride in 20 parts of carbon tetrachloride. At the same time, 10 parts by volume of a 10% aqueous caustic soda solution is run in, in a manner to maintain the reaction mixture weakly alkaline throughout. At the end of 3 additional hours, the carbon tetrachloride is distilled off by heat and a 2% aqueous common salt solution is added to the remaining solution. The precipitated dyestuff is separated by suction filtration at 20° C. and is then dried. It dyes cotton, regenerated cellulose and straw from aqueous solution in shades of green having good fastness to washing and to light.

*Example 47*

5.6 parts of compound I and 5.95 parts of compound IX are dissolved in 700 parts of water with 1.5 parts of lithium carbonate. In the course of 2 hours, there is run into the resultant solution, cooled to 0° C., a solution of 1.15 parts by volume of fumaryl chloride in 20 parts of carbon tetrachloride; at the same time the reaction is maintained constantly weakly alkaline by the sprinkling in of 0.8 part of lithium carbonate. After the lapse of 4 more hours, the reaction mixture is heated to boiling, the carbon tetrachloride is allowed to distil off, and a 4% aqueous solution of potassium chloride is added. After cooling, the dyestuff is separated by suction filtration and is dried. It dyes cotton, regenerated cellulose and straw in bluish-green shades.

*Example 48*

11.3 parts of compound I are dissolved in 750 parts of water with the addition of 1.5 parts of lithium carbonate. At a temperature of 0° C. and within the course of 1 hour, a solution of 1.9 parts of mesaconyl dichloride in 15% by volume of carbon tetrachloride is added, and the reaction mixture is maintained very weakly alkaline by the sprinkling in of 0.8 part of lithium carbonate. At the end of 5 more hours, the reaction mixture is heated to boiling, whereby the carbon tetrachloride is removed. After the addition of a 2% aqueous common salt solution, precipitated dyestuff is filtered off with suction at 50° C. and is then dried. From an aqueous solution, the dyestuff dyes cotton and regenerated cellulose in shades of green.

*Example 49*

11.4 parts of the lithium salt of compound I are dissolved in 750 parts by volume of water. At 0° C., while stirring vigorously and in the course of 2 hours, 2.1 parts of chlorofumaryl dichloride are added dropwise, the formed acid being neutralized to 0.8 part of lithium carbonate. Stirring is continued for 3 more hours and the dyestuff precipitated at 60° C. by the addition of a 3% aqueous common salt solution. The dyestuff is filtered off at 50° C. and is then dried. From an aqueous solution it dyes cotton and regenerated cellulose in bluish-green shades.

*Example 50*

5.9 parts of compound IX and 4.1 parts of compound III are dissolved in 500 parts of water with addition of 1.15 parts of lithium carbonate. 1.8 parts of fumaryl chloride are then added dropwise in the course of 2 hours and at a temperature of 0° C., while stirring vigorously. The reaction mixture is constantly maintained neutral by the sprinkling in of 2.2 parts of sodium bicarbonate. Stirring is continued for 5 more hours whereupon the mixture is heated to 75° C. and the dyestuff precipitated by acidification with 20 parts by volume of concentrated hydrochloric acid. The dyestuff is separated by suction filtration from the hot liquid and is then triturated with sodium carbonate until neutral reaction is achieved, whereupon it is dried. The obtained dyestuff dyes cotton, regenerated cellulose and straw from aqueous solution in bluish-green shades with good fastness to washing and to light.

Having thus disclosed the invention, what is claimed is:

1. A process for the preparation of a green substantive dyestuff of the anthraquinone series, which comprises condensing one mol of a 1-aminoanthraquinone-2-sulfonic acid which corresponds to the formula

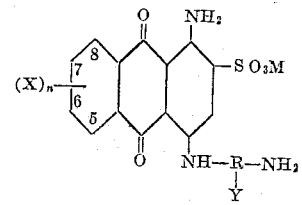

wherein X stands for a member selected from the group consisting of SO₃H, bromine and chlorine, $n$ is one of the integers 0 and 1, if X denotes SO₃H being in one of the positions 5 to 8, and is one of the integers 0 and 1, if X denotes bromine being in one of the positions 6 and 7, and is one of the integers 0, 1 and 2, if X denotes chlorine being in one and both of the positions 6 and 7, R stands for a member selected from the group consisting of the phenylene and diphenylene radicals, Y is a member selected from the group consisting of H, lower alkyl, lower alkoxy and SO₃H, and M stands for a member selected from the group consisting of H, Li, Na and K, with a second mol of a 1-amino-anthraquinone-2-sulfonic acid which corresponds to the said formula, wherein X, n, R, Y and M have the same or a different significance within the limits as indicated, in aqueous solution and in presence of an acid binding agent, by the action of one mole of a dihalide corresponding to the formula

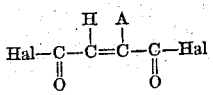

wherein Hal stands for a member selected from the group consisting of chlorine and bromine, and A stands for a member selected from the group consisting of H, chlorine, bromine and methyl.

2. A process for the preparation of a green substantive dyestuff of the anthraquinone series, which comprises condensing two mols of the compound of the formula

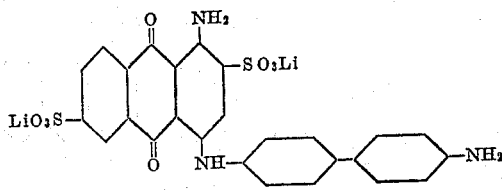

in aqueous solution and in presence of lithium carbonate, with one mol of fumaryl chloride.

3. A process for the preparation of a green substantive dyestuff of the anthraquinone series, which comprises condensing one mol of the compound of the formula

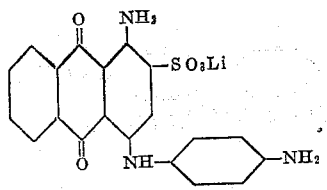

and one mol of a compound of the formula

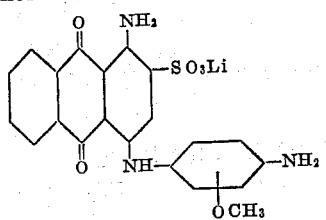

in aqueous solution and in presence of lithium carbonate, with one mol of fumaryl chloride.

4. A process for the preparation of a green substantive dyestuff of the anthraquinone series, which comprises condensing one mol of the compound of the formula

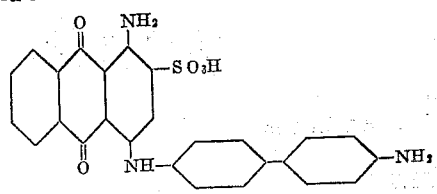

and one mol of a compound of the formula

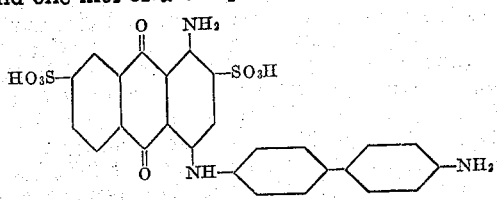

in aqueous solution and in presence of lithium carbonate, with one mol of fumaryl chloride.

5. A process for the preparation of a green substantive dyestuff of the anthraquinone series, which comprises condensing one mol of the compound of the formula

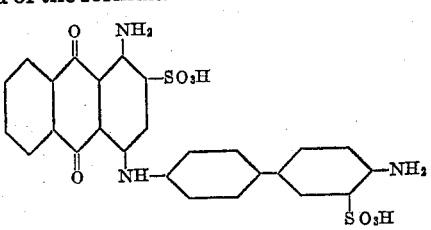

and one mol of a compound of the formula

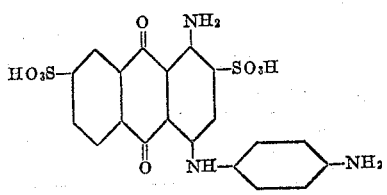

in aqueous solution and in presence of lithium carbonate, with one mol of fumaryl chloride.

6. A process for the preparation of a green substantive dyestuff of the anthraquinone series, which comprises condensing one mol of the compound of the formula

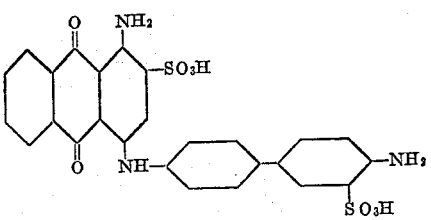

and one mol of a compound of the formula

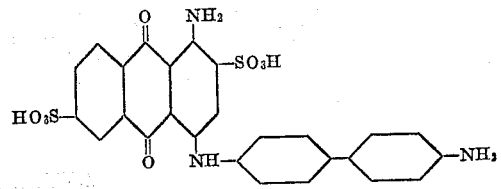

in aqueous solution and in presence of lithium carbonate, with one mol of fumaryl chloride.

7. A dyestuff which corresponds to the formula

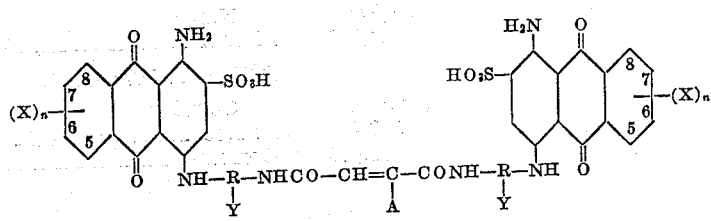

wherein R stands for a member selected from the group consisting of the phenylene and diphenylene radicals, Y stands for a member selected from the group consisting of H, lower alkyl, lower alkoxy and SO₃H, A stands for a member selected from the group consisting of H, chlorine, bromine and methyl, X stands for a member selected from the group consisting of SO₃H, bromine and chlorine, R, Y, A and X of both anthraquinone nuclei being equal or different within the limits as indicated, and wherein $n$ is one of the integers 0 and 1, if X denotes SO₃H being in one of the positions 5 to 8, and is one of the integers 0 and 1, if X denotes bromine being in one of the positions 6 and 7, and is one of the integers 0, 1 and 2, if X denotes chlorine being in one and both of the positions 6 and 7.

8. The dyestuff of the formula

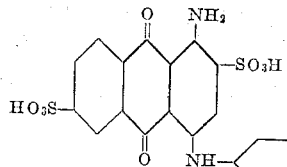 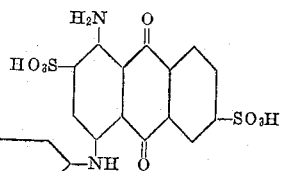

9. The dyestuff of the formula

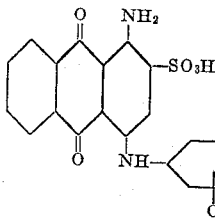 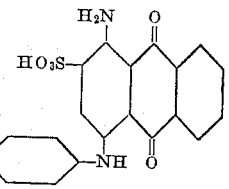

10. The dyestuff of the formula

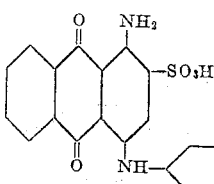 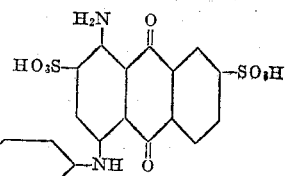

11. The dyestuff of the formula

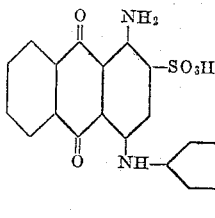 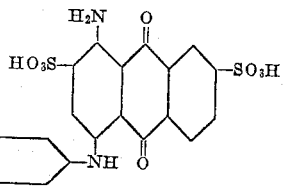

12. The dyestuff of the formula

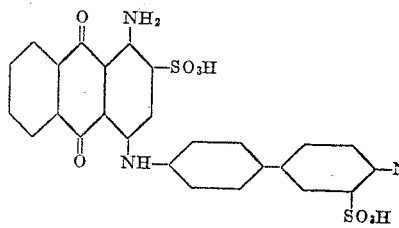 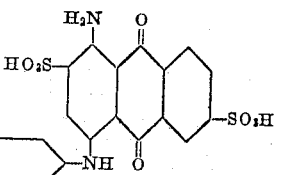

ALBIN PETER.
WOLFGANG FREY.

REFERENCES CITED

The following references are of record in the file of this patent:

UNITED STATES PATENTS

| Number | Name | Date |
|---|---|---|
| 938,565 | Fischer | Nov. 2, 1909 |

FOREIGN PATENTS

| Number | Country | Date |
|---|---|---|
| 399,495 | France | Jan. 1909 |
| 241,838 | Germany | July 1910 |